US008705135B2

(12) United States Patent
Furihata et al.

(10) Patent No.: US 8,705,135 B2
(45) Date of Patent: Apr. 22, 2014

(54) DISPLAY CONTROL APPARATUS AND METHOD OF CREATING LOOK-UP TABLE

(75) Inventors: Hirobumi Furihata, Kanagawa (JP); Takashi Nose, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1459 days.

(21) Appl. No.: 11/407,055

(22) Filed: Apr. 20, 2006

(65) Prior Publication Data

US 2006/0238480 A1 Oct. 26, 2006

(30) Foreign Application Priority Data

Apr. 26, 2005 (JP) ................................. 2005-127861

(51) Int. Cl.
*G09G 3/36* (2006.01)
*H04N 1/40* (2006.01)

(52) U.S. Cl.
USPC .......... 358/3.23; 358/519; 358/521; 358/514; 358/520; 358/3.01; 345/98; 345/89; 345/87; 348/807; 348/708

(58) Field of Classification Search
USPC ......................... 345/98, 89, 87; 348/807, 708
See application file for complete search history.

(56) References Cited

U.S. PATENT DOCUMENTS

| | | | | |
|---|---|---|---|---|
| 6,529,180 | B1 * | 3/2003 | Ito et al. | 345/89 |
| 6,806,860 | B2 * | 10/2004 | Saito et al. | 345/98 |
| 2001/0015774 | A1 * | 8/2001 | Endo et al. | 348/807 |
| 2004/0189679 | A1 * | 9/2004 | Ito et al. | 345/690 |
| 2004/0227977 | A1 * | 11/2004 | Yoshida | 358/3.01 |
| 2006/0132857 | A1 * | 6/2006 | Akashi | 358/448 |

FOREIGN PATENT DOCUMENTS

| | | | |
|---|---|---|---|
| JP | 7-56545 A | | 3/1995 |
| JP | 2001-238227 A | | 8/2001 |
| JP | 2002-108301 A | | 4/2002 |
| JP | 2002108301 A | * | 4/2002 |

* cited by examiner

*Primary Examiner* — Quang N Vo
(74) *Attorney, Agent, or Firm* — Sughrue Mion, PLLC

(57) ABSTRACT

A display control apparatus according to an embodiment of the present invention includes: a grayscale converting circuit for converting input image data to output image data using a look-up table showing a correspondence between input image data of i bits and output image data of k bits larger than the i bits; and an LUT creating circuit for creating the look-up table based on γ data of $2^k$ bits. The apparatus further includes a γ data storage circuit capable of storing the plural γ data in the LUT creating circuit.

14 Claims, 15 Drawing Sheets

γ-DATA G [ j ] ( j = 0~255)

| | | | | | | | |
|---|---|---|---|---|---|---|---|
| γ-DATA ADDRESS | 0 | 1 | 2 | 3 | 4 | ········ | 255 |
| γ-DATA VALUE | 1 | 0 | 0 | 1 | 0 | ········ | 1 |

RELATED ART

RELATED ART

| LUT ADDRESS (PRECORRECTION GRAYSCALE VALUE) | LUT VALUE (CORRECTED VALUE) |
|---|---|
| 0 | 0 |
| 1 | 3 |
| 2 | 5 |
| ⋮ | ⋮ |
| 63 | 255 |

Fig. 16

DISPLAY CONTROL APPARATUS AND METHOD OF CREATING LOOK-UP TABLE

BACKGROUND OF THE INVENTION

1. Field of the Invention

The present invention related to a display control apparatus that executes gamma correction of a display device such as a liquid crystal panel. In particular, the invention relates to a display control apparatus that executes gamma correction using a look-up table, and a method of creating a look-up table used for the gamma correction.

2. Description of Related Art

In the case of displaying an image on a display device such as a liquid crystal panel, grayscales of image data to be displayed should be corrected in accordance with gamma characteristics of the display device. Such correction is called "gamma correction" Incidentally, a correcting method using a look-up table (LUT) has been conventionally and widely used for gamma correction of digital image data (for instance, Japanese Unexamined Patent Publication Nos. 2001-238227 and 7-56545).

The LUT is a table that stores grayscale values of digital image data after being subjected to the gamma correction in association with grayscale values of the digital image data. FIG. 16 shows an example of the LUT. The LUT of FIG. 16 is an LUT for gamma correction that converts image data of 64 grayscales (6 bits) into image data of 256 grayscales (8 bits), and an LUT address represents a grayscale value of image data before the gamma correction, and an LUT value represents a grayscale value after the gamma correction.

In this way, the LUT realizes one-dimensional array by storing grayscale values of image data after gamma correction with grayscale values of the image data before the gamma correction used as an argument. Accordingly, if an LUT is stored in a memory having as many address bus width as the number of bits of the image data before gamma correction and as many data bus width as the number of bits of the image data after the gamma correction, and the above LUT address is used as an input address, an output of the LUT value can be obtained.

Further, it is necessary to switch a current LUT to an appropriate LUT in accordance with whether or not to execute gamma correction on input image data, and changes in surrounding environments and image type instead of executing gamma correction for one display device by use of one LUT all the time. Hence, a display control apparatus that switches LUTs to execute suitable gamma correction has been hitherto known.

FIG. 15 shows an example of a conventional display control apparatus. A display control apparatus 80 is a controller driver for receiving image data from a processor 2 such as a CPU to display an image on a liquid crystal panel 4. A control circuit 81 receives image data and LUT data from the processor 2. A grayscale converting circuit 14 executes gamma correction, which references the LUT to convert grayscales of input image data. Further, the grayscale converting circuit 14 outputs converted image data to a data line driving circuit 16. The data line driving circuit 16 applies a voltage that is selected from grayscale voltages generated by a grayscale voltage generating circuit 15 in accordance with the image data, to the liquid crystal panel 4. A gate line driving circuit 3 applies a gate pulse to the liquid crystal panel 4 in accordance with a driving timing control signal output from the control circuit 81 to drive the liquid crystal panel 4.

A LUT memory 90 stores plural different LUTs. When the grayscale converting circuit 14 changes an LUT used for the gamma correction, the processor 2 outputs the LUT data read from the LUT memory 90 to the control circuit 81, and the grayscale converting circuit 14 receives the LUT data from the control circuit 81 to update the LUT.

The above conventional display device faces a problem in that a large memory capacity is necessary for storing an LUT. For example, provided that the number of bits of image data before gamma correction is i, that is, the number of grayscales is $2^i$, and the number of bits of the image data after the gamma correction is k, that is, the number of grayscales is $2^k$, an LUT data size necessary for the grayscale conversion equals ($2^i$*k bits). Considering that the image data before gamma correction is 6-bit data, and the corrected image data is 8-bit data, the LUT data size equals 512 bits (=26*8).

As the number of bits of image data increases, the LUT data size exponentially increases. A memory capacity necessary for storing the LUT is accordingly increased. Incidentally, image data of R (red), G (green), and B (blue) have different gamma characteristics, so LUTs have to be provided for each of R, G, and B. Further, in the case of switching the LUTs in accordance with surrounding circumstances, the above LUT memory 90 stores plural LUTs in accordance with the surrounding circumstances, and thus requires a large memory capacity. As a LUT data size increases, it takes longer time to transfer LUT data from the processor 2 to the display control apparatus 80, and to update an LUT of the grayscale converting circuit 14.

SUMMARY OF THE INVENTION

A display control apparatus for executing gamma correction on input image data according to an aspect of the invention includes: a grayscale converting circuit for converting input image data to output image data using a look-up table showing a correspondence between input image data of i bits and output image data of k bits larger than the i bits; an LUT creating circuit for creating the look-up table based on a data sequence of larger than $2^i$ bits and $2^k$ bits or smaller; and one or more storage circuits which are capable of storing the data sequence respectively.

With such configuration, it is possible to create an LUT using a data sequence with larger than $2^i$ bits and $2^k$ bits or smaller, so it is unnecessary to store the LUT even in the case of switching the plural LUTs. Hence, as compared with the case of storing the LUT having a data size of $2^i$*k bits, the memory capacity can be saved.

Further, the method of creating a look-up table according to the present invention is a method of creating a look-up table that shows a correspondence between the input image data of i bits and the output image data of k bits larger than i bits, and is used for the grayscale conversion. More specifically, first, a one-dimensional array in which one array element is 1 bit and which has more than $2^i$ and $2^k$ or less array elements is referenced. Next, a grayscale value of the output image data is used as an argument of the one-dimensional array. Based on the sum of the array elements of the one-dimensional array, a grayscale value of the input image data is calculated. Finally, the grayscale value as an argument of the output image data is associated with the calculated grayscale value of the input image data and used as an element of the look-up table.

With such a method, an LUT having a data size of $2^i$*k bits can be created based on the one-dimensional array data of more than $2^i$ bits and $2^k$ bits or smaller. Thus, when the plural LUTs are switched, instead of directly storing the LUT, the LUT can be stored as one-dimensional array data of $2^k$ bits to save the memory capacity.

According to the present invention, it is possible to provide a display control apparatus capable of storing a LUT with a small memory capacity, and a method of creating an LUT based on data stored with a small memory capacity.

BRIEF DESCRIPTION OF THE DRAWINGS

The above and other objects, advantages and features of the present invention will be more apparent from the following description taken in conjunction with the accompanying drawings, in which:

FIG. 16 is an example of a look-up table.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 15:
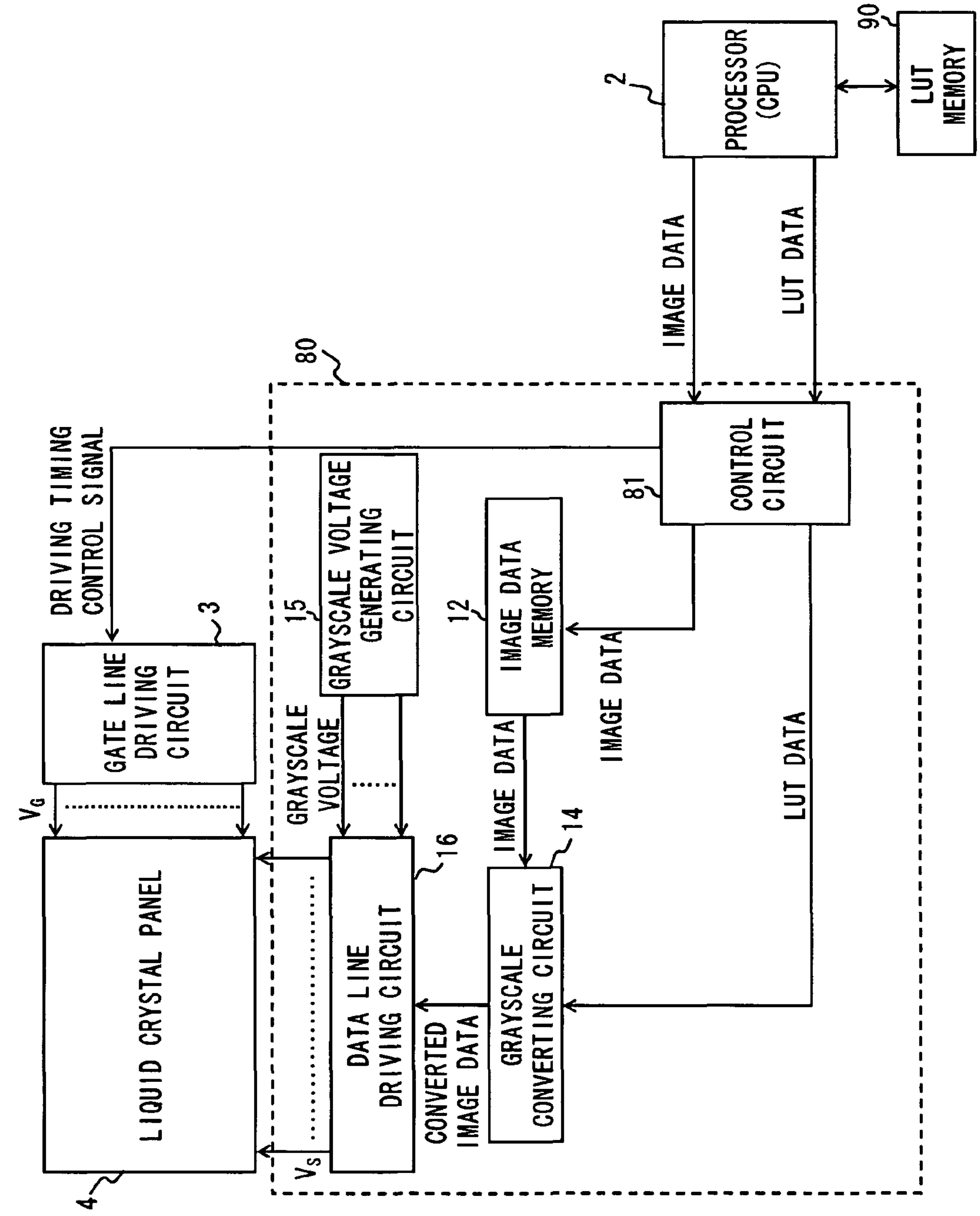
FIG. 15 is a diagram of a conventional display control apparatus.

Hereinafter, embodiments of the present invention are described in detail with reference to the accompanying drawings. Incidentally, the following embodiments are obtained by applying the present invention to a controller driver for driving a liquid crystal panel. Components having the same functions as those of the conventional technique of FIG. 15 are denoted by like reference numerals, and detailed description thereof is omitted.

First Embodiment

Figure 1:
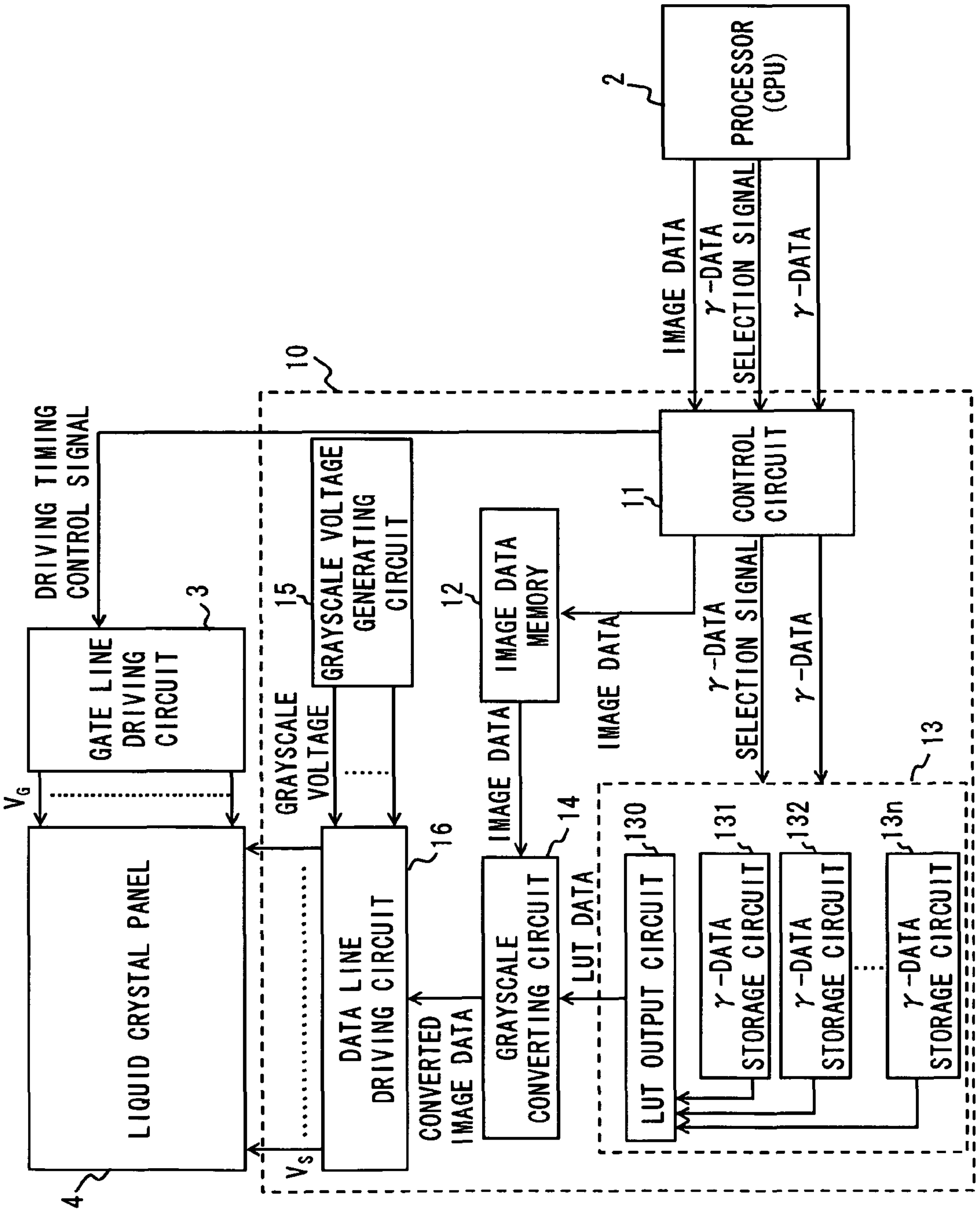
FIG. 1 is a diagram of a controller driver according to a first embodiment of the present invention.

FIG. 1 shows the structure of a controller driver 10 according to a first aspect of the invention. A control circuit 11 receives image data, a γ-data selection signal, and γ data from a processor 2 such as a CPU. Further, the control circuit 11 stores the received image data in an image data memory 12, and the received γ data selection signal and γ data are output to an LUT creating circuit 13.

Here, the γ data is used for creating an LUT, and one LUT can be created based on one γ data. The transfer of the γ data from the processor 2 to the control circuit 11 is executed if new γ data is required, that is, a new LUT is required. In addition, the γ data selection signal indicates the LUT creating circuit 13 to output an LUT. A format of the γ data and a method of creating the LUT are described later.

The LUT creating circuit 13 includes an LUT output circuit 130, and n γ data storage circuits 131 to 13*n*. The γ data storage circuits 131 to 13*n* can store one γ data, respectively. The γ data received from the control circuit 11 is stored in the γ data storage circuits 131 to 13*n*. The number of γ data storage circuits "n" of the LUT creating circuit 13 may be determined in accordance with the number of LUTs that are rewritten by the grayscale converting circuit 14 and used.

The LUT output circuit 130 creates an LUT based on the γ data stored in the γ data storage circuits 131 to 13*n*, and the created LUT is output to the grayscale converting circuit 14.

Functions and operations of the image data memory 12, the grayscale converting circuit 14, a grayscale voltage generating circuit 15, a data line driving circuit 16, a gate line driving circuit 3, and a liquid crystal panel 4 are the same as those of the conventional technique of FIG. 15.

Figures 2, 3:
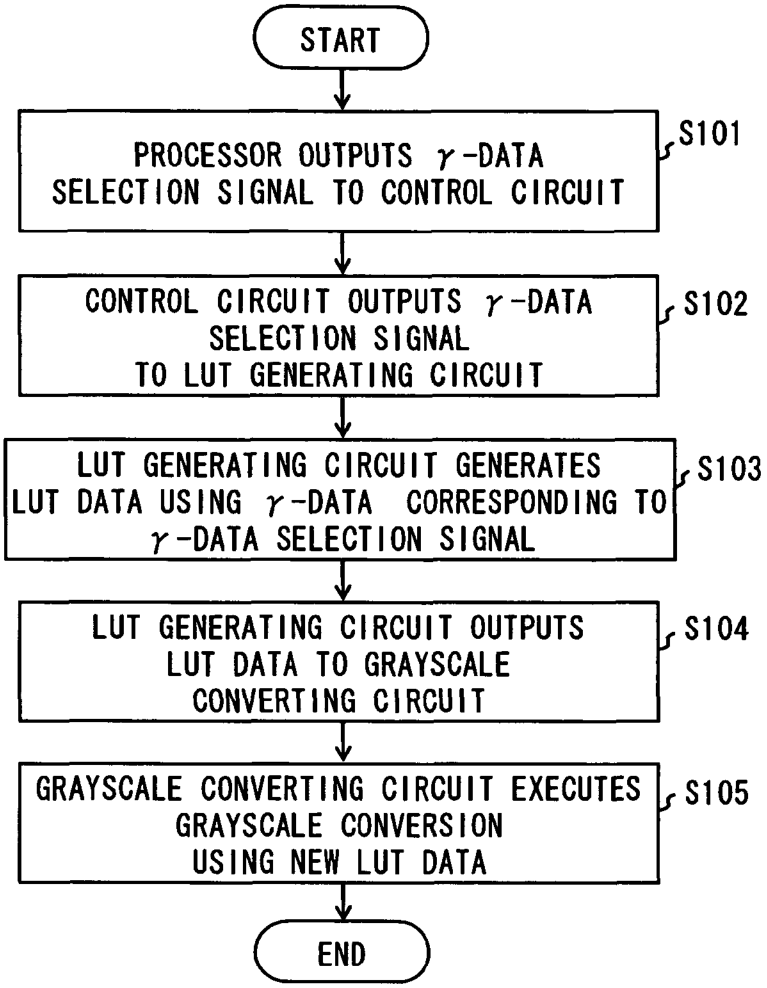
FIG. 2 is a flowchart of a method of updating an LUT.
FIG. 3 shows an example of γ data.

Referring next to a flowchart of FIG. 2, a procedure of rewriting an LUT applied to the grayscale converting circuit 14 is described. First, in step S101, the processor 2 determines that an LUT should be rewritten in accordance with a change in surrounding environments or other conditions, and outputs the y data selection signal to the control circuit 11.

In step S102, the control circuit 11 outputs the γ data selection signal received from the processor 2 to the LUT creating circuit 13. In step S103, the LUT creating circuit 13 creates LUT data using the γ data corresponding to the input γ data selection signal. To be specific, the γ data corresponding to the input γ data selection signal is read from one of the γ data storage circuits 131 to 13*n* and sent to the LUT output circuit 130, and the LUT output circuit 130 generates LUT data based on the γ data.

In step S104, the LUT creating circuit 13 outputs the generated LUT data to the grayscale converting circuit 14. Finally, in step S105, the grayscale converting circuit 14 converts grayscales of the image data using a new LUT input from the LUT creating circuit 13.

In this way, the controller driver 10 according to the present invention has a feature of storing not LUT data itself but γ data corresponding to LUT data in a one-to-one relationship and creating an LUT based on the γ data. In the following description, the data format of the γ data and a method of creating an LUT are described in detail with reference to FIGS. 3 to 6.

First, the data format of the γ data is described. The γ data can be represented as a one-dimensional array G[j] (j=0 to m-1) with a grayscale value (k bits) after the gamma correction used as the argument, in which 1-bit logical values indicating whether or not a grayscale corresponding to the argument is used are array elements. Here, the number of elements "m" of the array G[j] is $2^k$.

FIG. 3 shows an example of the γ data. The γ data G[j] of FIG. 3 corresponds to LUTs for converting 6-bit input data to 8-bit input data in a one-to-one relationship. In this case, since k=8, the number of elements of the array G[j] is $2^8$ (=256). Here, γ data addresses as element numbers of the array G[j] correspond to grayscale values of the image data after the gamma correction. Further, γ data values as array elements of the array G[j] indicate whether or not a grayscale value corresponding to the γ data address is included in the LUT values. For example, in the γ data G[j] of FIG. 3, the γ data value of γ data addresses 0, 3, 5, and 255 is "1". This means that LUT values (grayscale values after gamma correction) of an LUT that is created based on the γ data G[j] include 0, 3, 5, and 255.

Figure 4:
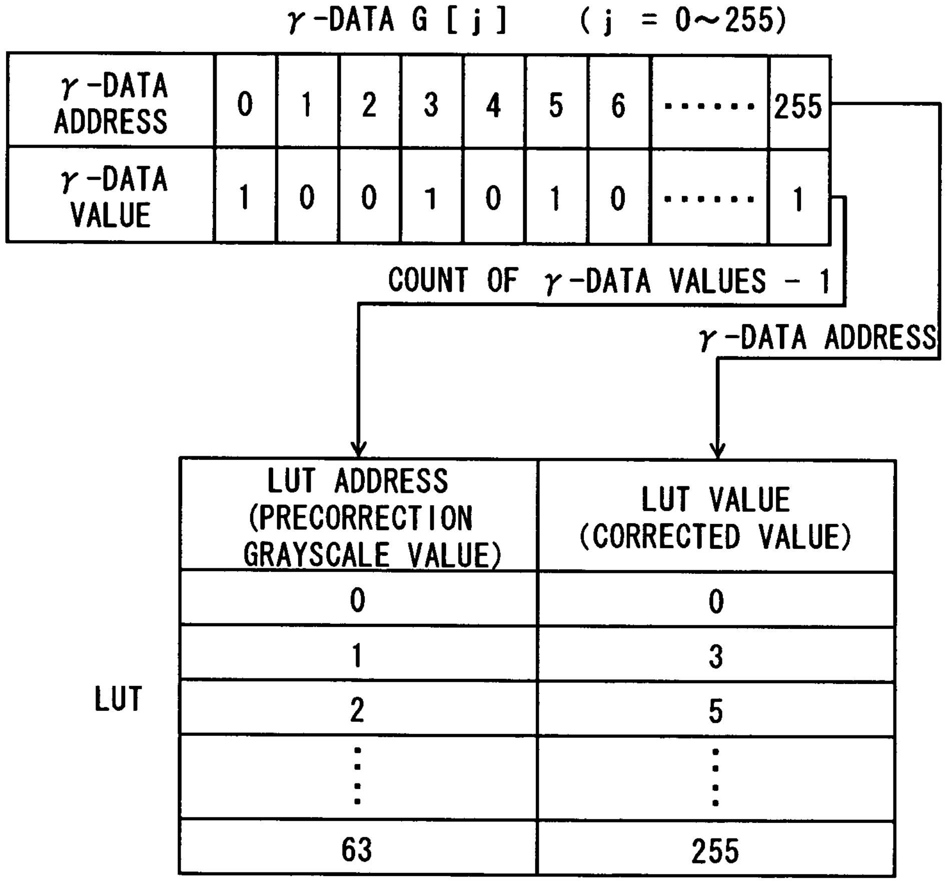
FIG. 4 shows a correspondence between γ data and an LUT.

Incidentally, in the LUT, the LUT values and the LUT addresses (grayscale values before gamma correction) should be associated together. Referring to FIG. 4, an associating method is described.

FIG. 4 shows a correspondence between the γ data G[j] and LUTs. As has been described, the γ data address of the array element having the γ data value of "1" corresponds to the LUT value. An LUT address paired with an LUT value corresponding to a given γ data address corresponds to a value calculated by subtracting 1 from the sum of the γ data values from the top of the γ data array G[j] to the γ data address.

For example, in FIG. 4, the γ data value as an array element with the argument set to the γ data address of 0 is "1". At this time, G[0] is the top of the γ data array, so the sum of the γ data values from the top of the γ data array is 1. Hence, the LUT address equals 0 (=1−1), and a corresponding LUT value is determined as 0. Further, the γ data value as an array element with the argument set to the γ data address of 3 is "1". At this time, the sum of the γ data values from the top G[0] to G[3] of the γ data array is 2, the LUT address equals 1 (=2−1), and a corresponding LUT value is 3 to thereby associate LUT addresses with LUT values.

In an LUT for converting 6-bit image data to 8-bit image data, 64 LUT addresses 0 to 63 are provided, so the γ data value of 64 array elements out of the 256 array elements of the γ data G[j] is set to "1", whereby the γ data G[j] can corresponding to LUTs in a one-to-one relationship.

Incidentally, if the image data after the gamma correction is k-bit data, a data size of the γ data is $2^k$ bits.

An effect of saving a memory capacity using the γ data is explained taking the case of converting grayscales of the image data before gamma correction to obtain image data of grayscales four times the grayscales before the gamma correction. If the image data before gamma correction is 6-bit data, and the image data after the gamma correction is 8-bit data, a data size of the LUT is 512 bits ($=2^6*8$), while a γ data size is 256 bits ($=2^8$). Hence, instead of storing an LUT itself, the LUT is stored as the γ data, by which a memory capacity can be reduced to ½. Further, if the image data before gamma correction is 8-bit data, and image data after the gamma correction is 10-bit data, a data size of the LUT is 2560 bits ($=2^8\times10$), while a γ data size is 1024 bits ($=2^{10}$). Hence, storing the LUT as the γ data reduces the memory capacity to 1/2.5. In this way, γ data formats corresponding to LUTs in a one-to-one relationship are adopted to create an LUT based on the γ data. Thus, a memory capacity can be significantly reduced as compared with the case of storing the LUT itself.

Further, the LUT is converted into a gamma data format and stored to reduce a requisite memory capacity of the controller driver 10 for rewriting an LUT without receiving the LUT data from an external processor 2. Thus, it is easy to integrate functions of the controller driver 10 on one bare chip using SoC (System on a Chip) technique, and integrate components of the controller driver 10 into one package using SiP (System in a Package).

Further, the γ data is stored in the controller driver 10, and thus, unlike the conventional display control apparatus 80, it is unnecessary to receive LUT data from an external LUT memory 90 each time the LUTs are switched. Hence, the LUT applied to the grayscale converting circuit 14 can be rewritten at timings of the controller driver 10. Thus, it is possible to rewrite an LUT in sync with a frame changing timing of a display image, for example. With such operation, image quality deterioration due to switching of the LUTs in the middle of the image frame can be avoided. In addition, since the LUT can be rewritten in the controller driver 10, the power necessary for transferring the LUT data from the processor 2 to the display control apparatus 80 can be saved.

There has been conventionally known a method of reducing a memory capacity for storing an LUT to thin out the grayscales of the LUT, reduce the data size of the LUT, and create the thinned grayscales through the interpolation. However, such a method involving the interpolation has problems in that precise gamma correction cannot be executed, and computation of the interpolation processing is complicated. In contrast, the above method of creating the LUT using the γ data can completely restore an LUT without reducing information amount of the original LUT. Thus, precise gamma correction can be executed, and as described below, computation for creating an LUT is simpler than the interpolation processing.

Further, the above example describes that image data of 64 grayscales (6 bits) is converted into image data of 256 grayscales (8 bits). However, the gradient of the gamma curve of liquid crystal, that is, a rate of luminance change to a change in input voltage of the liquid crystal becomes large at the intermediate grayscale, and small at the grayscales on both ends (dark tone and light tone). Hence, if grayscales on both ends are converted into lower ones, for example, if an image of 256 grayscales is converted into a rough image of lower grayscales of 192 levels in the case of executing grayscale conversion from the 6-bit image data into 8-bit image data, the gamma correction accuracy is not so deteriorated in some cases.

However, even if the number of grayscales of the converted image data is reduced, a LUT data size is not changed. Thus, in the conventional structure where plural LUTs are stored in the LUT memory 90, even if the number of grayscales of the converted image data is reduced, a memory capacity necessary for storing the LUTs cannot be saved. In contrast, according to the structure of the present invention, the number of grayscales of the converted image data is decreased to reduce the γ data size. In the above-mentioned example, a size of one γ data can be reduced from 256 bits to 192 bits, and a memory capacity necessary for saving the γ data can be reduced. In short, aγ data size necessary for creating an LUT for converting image data of i bits to image data of k bits is above 2i bits and 2k bits or smaller. With such a method, a memory capacity necessary for storing the γ data can be further reduced.

Figure 5:
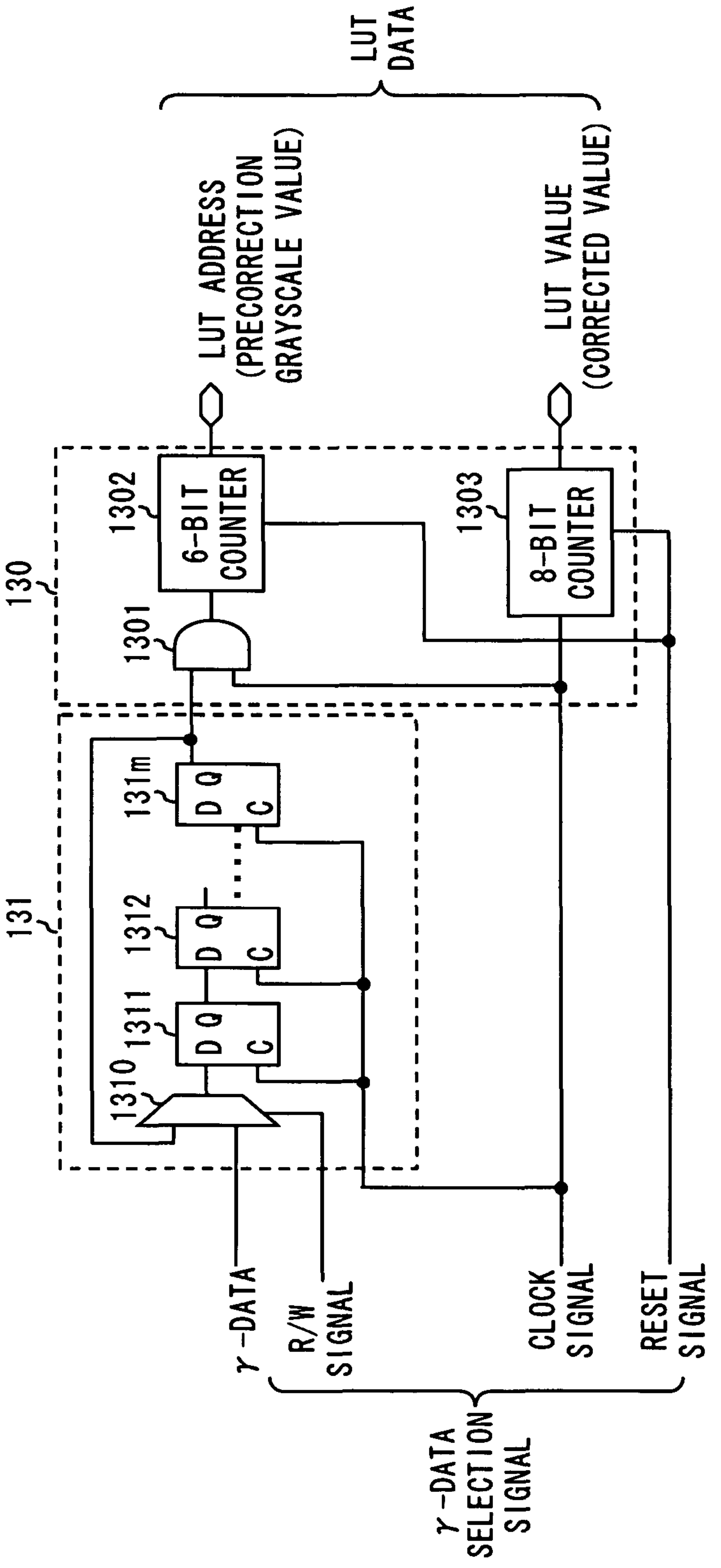
FIG. 5 shows a configuration example of an LUT creating circuit.

Subsequently, configuration examples and operations of the LUT output circuit 130 and gamma data storage circuits 131 to **13*n* of the LUT creating circuit 13 are described. FIG. 5 shows configuration examples of the LUT output circuit 130 and the gamma data storage circuit 131. Incidentally, the gamma data storage circuits 132 to 13*n* have the same configuration as that of the gamma data storage circuit 131**.

The gamma data storage circuit 131 has shift register composed of flip flop circuits (FF) 1311 to **131*m*. The shift register stores the γ data, and the length of shift register is the same as the number of elements of the above γ data G[j]. An output of the last FF131*m* is sent to the LUT output circuit 130, and fed back to the top FF1311 through an input selector 1310. The input selector 1310 selects one of the γ data and a feedback signal from the FF131*m* in accordance with an R/W signal as an output signal. More specifically, if the R/W signal designates a write operation, the γ data is selected. If the R/W signal designates a read operation, the feedback signal of the FF131*m*** is selected.

The LUT output circuit 130 includes a matching circuit 1301, a 6-bit counter 1302 and an 8-bit counter 1303. If an output of the last FF**131*m* is "1", an output of the matching circuit 1301 becomes "1". Thus, the 6-bit counter 1302 is incremented. Further, the 8-bit counter 1303 is incremented in accordance with a Clock signal. Incidentally, the R/W signal, the Clock signal, and a Reset signal are γ data selection signals sent from the control circuit 11**.

Figure 6:
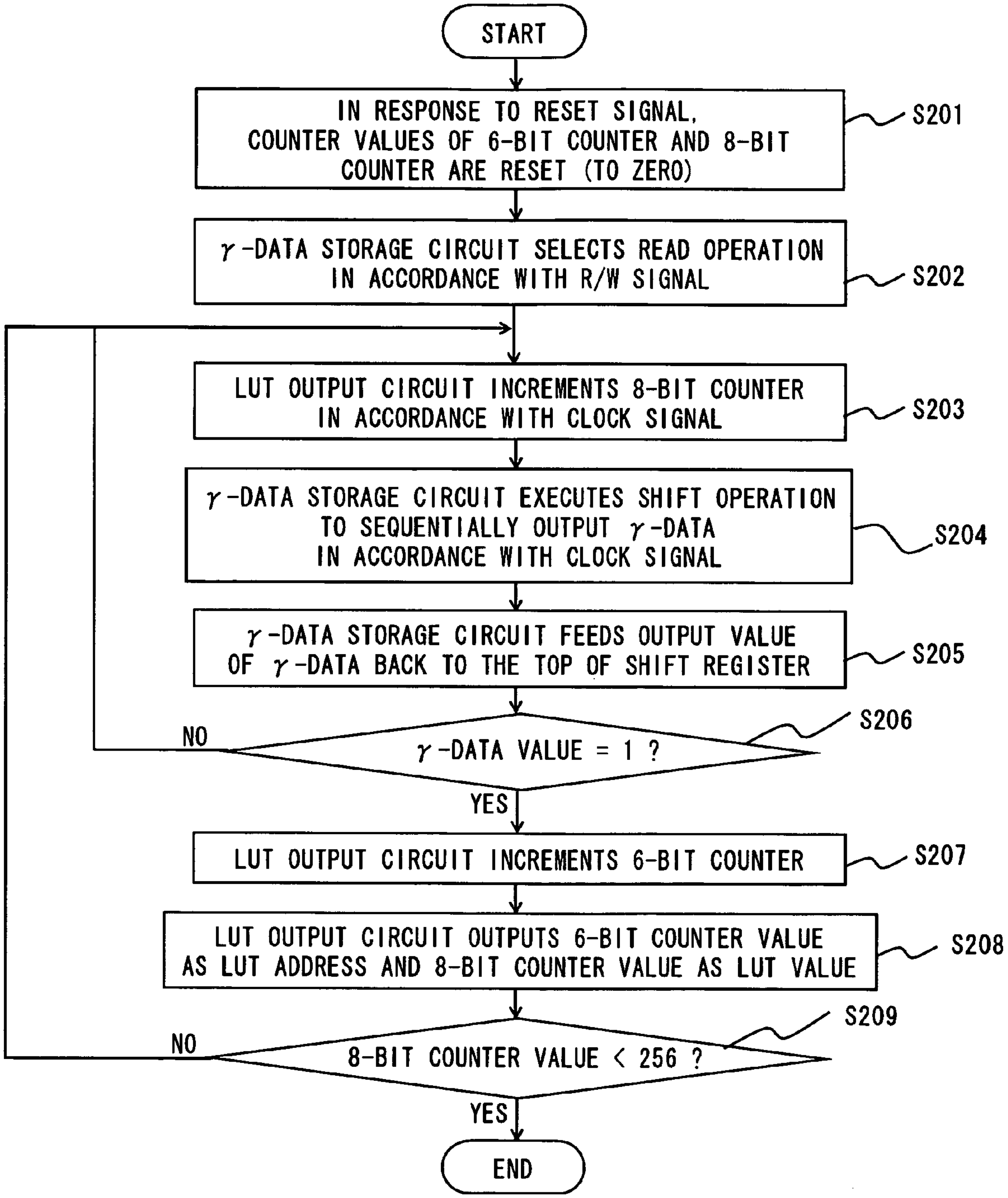
FIG. 6 is a flowchart of an LUT creating method.

Referring to a flowchart of FIG. 6, an operation of creating an LUT with the LUT output circuit 130 and the γ data storage circuit 131 of FIG. 5 is described. In step S201, in accordance with the Reset signal, the 6-bit counter 1302 and the 8-bit counter 1303 are reset to zero. In step S202, the γ data storage circuit 131 selects a read operation in accordance with the R/W signal. In step S203, the LUT output circuit 130 increments the 8-bit counter 1303 in accordance with the Clock signal. In step S204, the γ data storage circuit 131 executes a shift operation of the shift register composed of the FFs 1311 to 131*m* in accordance with the Clock signal, and outputs the γ data to the LUT output circuit 130. The γ data output as a result of the shift operation in step S204 is input to the top FF1311 of the shift register (in step S205).

In step S206, the LUT output circuit 130 determines whether or not the γ data value input from the γ data storage circuit 131 is "1" with the matching circuit 1301. If the γ data value is "1", the 6-bit counter 1302 is incremented (in step S207). In addition, the LUT output circuit 130 outputs a count value of the 6-bit counter 1302 as the LUT address, and outputs a count value of the 8-bit counter 1303 as the LUT value to the grayscale converting circuit 14 (in step S208).

In step S209, it is determine whether or not the count value of the 8-bit counter 1303 is less than 256, and if the value is less than 256, the process returns to step S203. If the value reaches 256, the creation of the LUT is completed.

In this way, a method of creating the LUT using the γ data can be easily executed using a shift register and a counter, so complicated computation is unnecessary unlike the conventional method of creating the LUT data through the interpolation.

Incidentally, the γ data storage circuits 131 to 13*m* may be composed of nonvolatile memories such as a RAM, an EEPROM, or a flash memory instead of the shift register using flip flop circuits. In the case of using the nonvolatile memory, an initial value of the γ data can be set, so there is an advantage in that it is unnecessary to input the initial value of the γ data from the processor 2.

Second Embodiment

Figure 7:
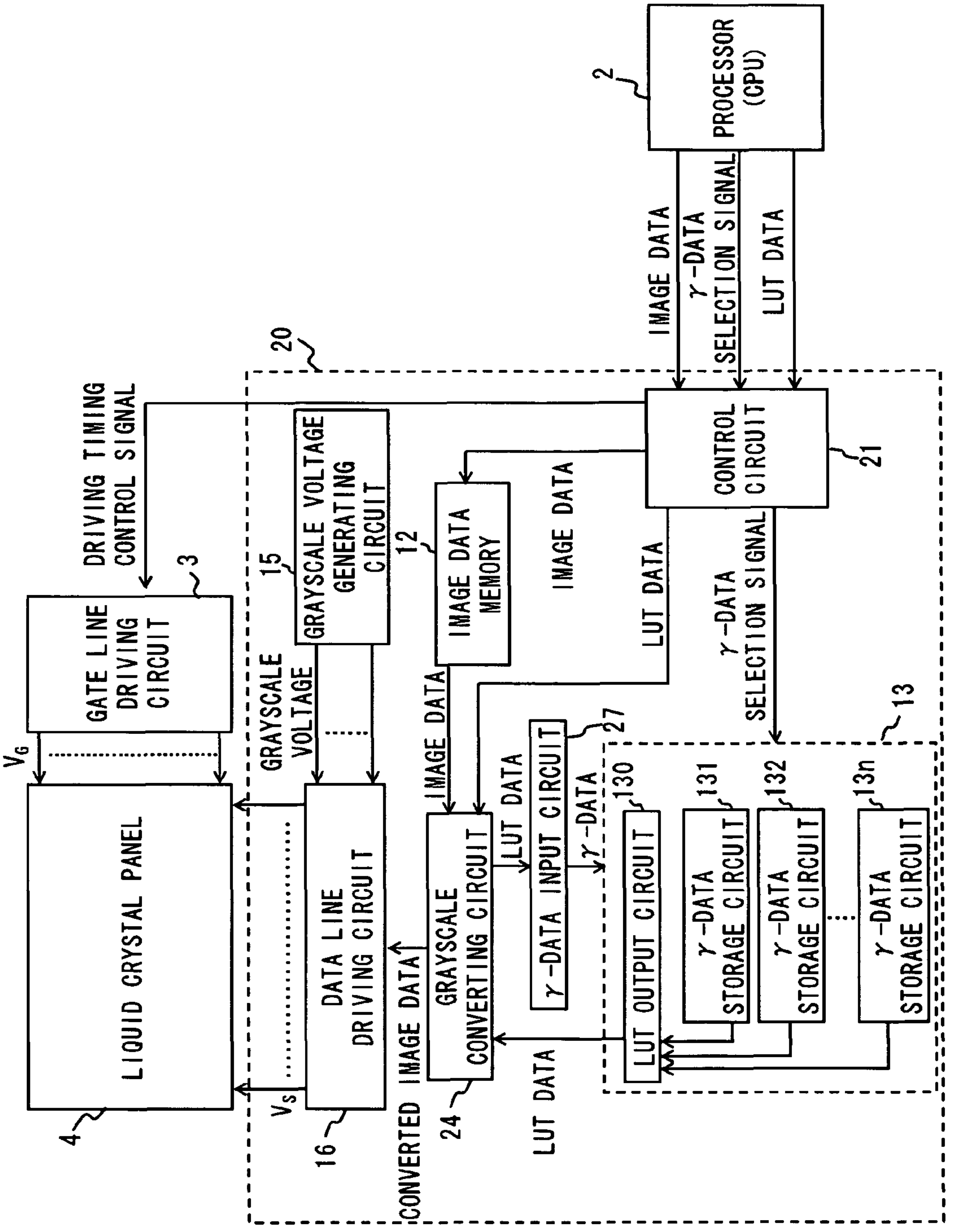
FIG. 7 is a diagram of a controller driver according to a second embodiment of the present invention.

FIG. 7 shows the configuration of a controller driver 20 according to a second embodiment of the present invention. The controller driver 20 differs from the controller driver 10 of the first embodiment in that the controller driver 20 receives the LUT data from the processor 2, and converts the LUT data to the γ data and store the γ data in a γ data generating circuit 13. A detailed description there of is given below.

A control circuit 21 receives the image data, the γ data selection signal, and the LUT data from the processor 2. The LUT data is output from the processor 2 to the control circuit 21 if a new LUT needs to be applied to the grayscale converting circuit 24. The control circuit 21 stores the received image data in the image data memory 12, outputs the γ data selection signal to the LUT creating circuit 13, and outputs the LUT data to the grayscale converting circuit 24.

The grayscale converting circuit 24 has the functions of the grayscale converting circuit 14 of the controller driver 10, and in addition, has a function of changing, if the control circuit 21 inputs LUT data, an LUT used for the gamma correction to the inputted LUT. Further, the inputted LUT data is output to a γ data input circuit 27.

The γ data input circuit 27 converts the LUT data input from the grayscale converting circuit 24 to the γ data, and the converted γ data is stored in one of the γ data storage circuits 131 to 13*n* of the LUT creating circuit 13.

Functions and operations of the other circuits of the controller driver 20 are the same as those of the controller driver 10.

With such configuration, the processor 2 does not need to transfer the γ data to the controller driver 20, and needs only to transfer the LUT data as in the conventional technique. Hence, the processing of the processor 2 can be adopted with little change. Further, in the configuration of this embodiment, the LUT input from the processor 2 is stored in the grayscale converting circuit 24, so the LUT may be converted into γ data in accordance with a clock signal of the controller driver 20. Thus, the circuit scale of the γ data input circuit 27 can be reduced as described below.

Figure 8:
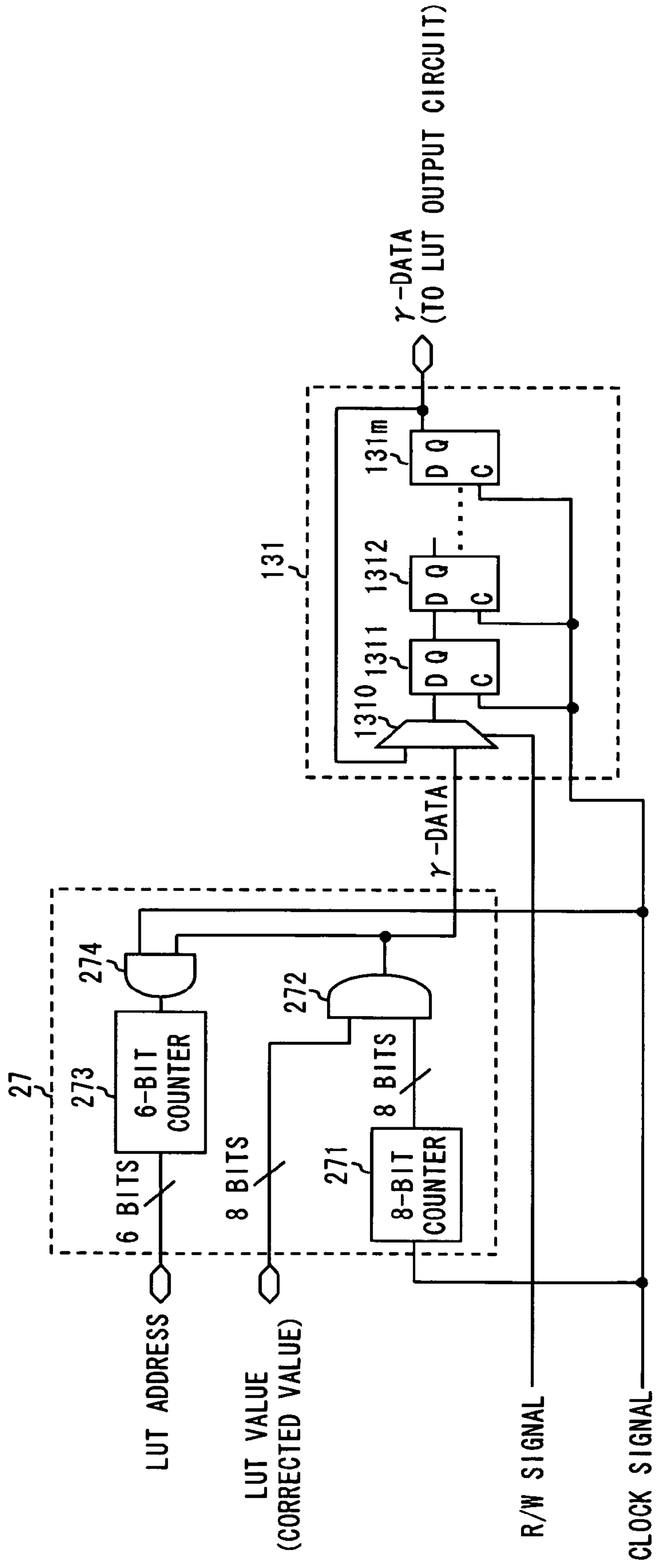
FIG. 8 shows a configuration example of a γ data input circuit.

FIG. 8 shows a configuration example of the γ data input circuit 27. FIG. 8 shows the configuration for converting the LUT where the image data before gamma correction is 6-bit data, and the image data after the gamma correction is 8-bit data into the γ data. The γ data input circuit 27 includes an 8-bit counter 271 and a matching circuit 272. The 8-bit counter 271 is incremented in accordance with a Clock signal, and if the count value of the 8-bit counter matches the LUT value, the matching circuit 272 outputs a value of "1". If the count value of the 8-bit counter 271 does not match the LUT value, the matching circuit 272 outputs a value of "0". Further, a 6-bit counter 273 is incremented in accordance with an output signal of an AND circuit 274 whose input signals are an output of the matching circuit 272 and the Clock signal, whereby an LUT address corresponding to a LUT value to be next input to the matching circuit 272 is obtained. In the matching circuit 272, the count value of the 6-bit counter 273 is regarded as the LUT address to repeatedly determine whether or not the LUT address matches the LUT value, and as a result, outputs of the matching circuit 272 become γ data.

The γ data output from the matching circuit 272 is input to the γ data storage circuit 131. The configuration of the γ data storage circuit 131 is the same as that of FIG. 5, so its description is omitted here. Incidentally, at the time of storing the γ data, a write operation is designated by the R/W signal, and the input selector 1310 may select an input side of the γ data.

Third Embodiment

Figure 9:
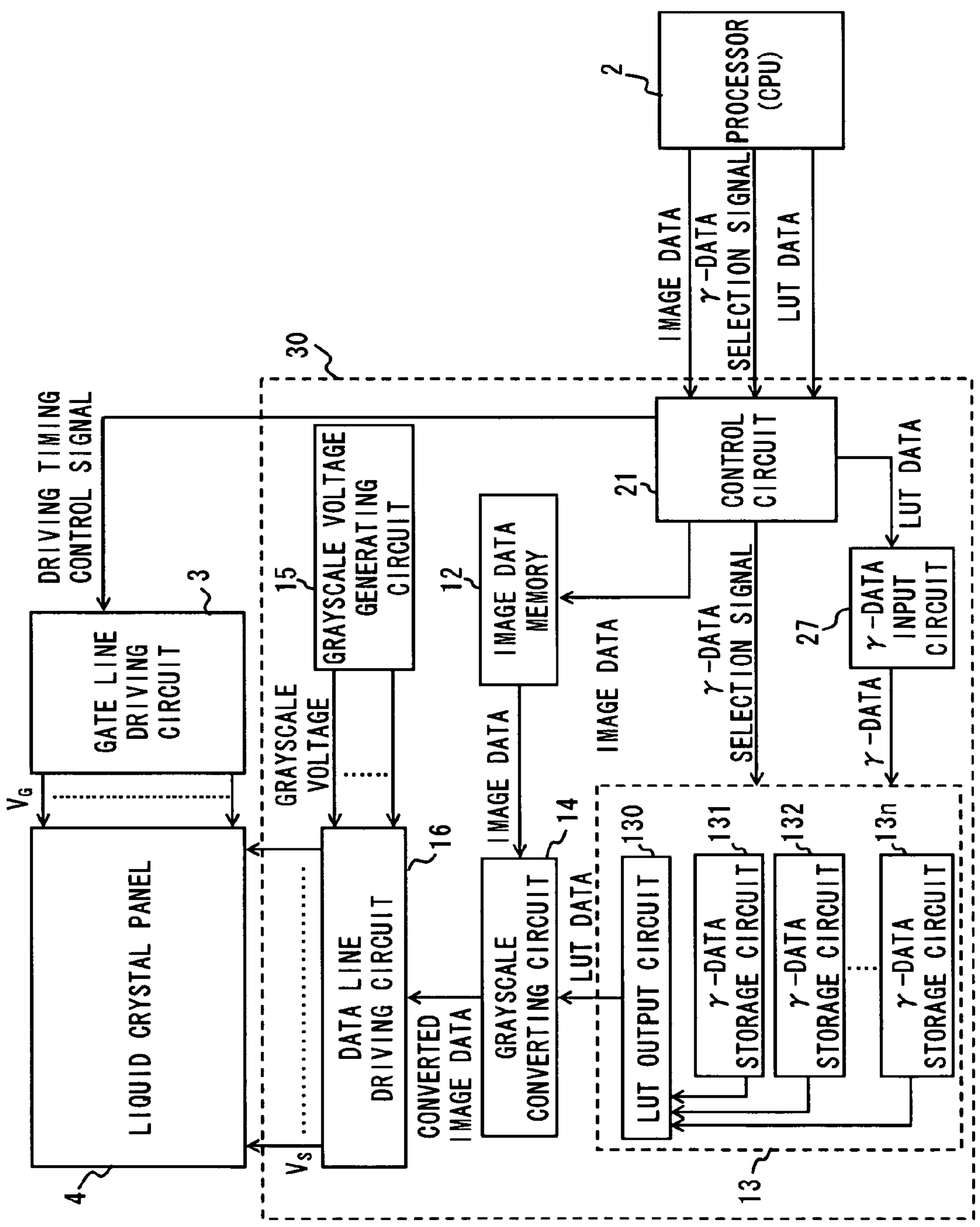
FIG. 9 is a diagram of the controller driver according to a third embodiment of the present invention.

FIG. 9 shows the configuration of a controller driver 30 according to a third embodiment of the present invention. The controller driver 30 differs from the controller driver 20 according to the second embodiment of the invention in terms of the arrangement of the γ data input circuit 27.

Figure 10:
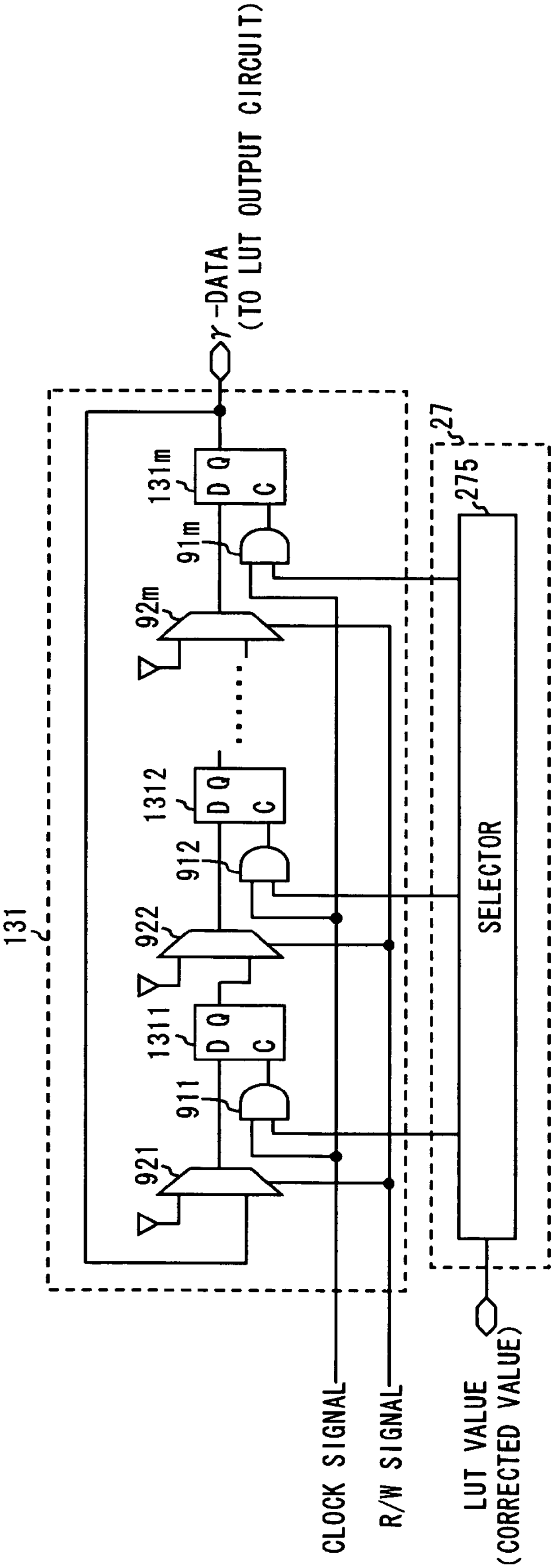
FIG. 10 shows a configuration example of the γ data input circuit.

FIG. 10 shows a configuration example of the γ data input circuit 27 suitable for this embodiment. FIG. 10 shows the configuration for converting an LUT where the image data before gamma correction is 6-bit data, and the image data after the gamma correction is 8-bit data into γ data, similar to the illustrated example of FIG. 8. The γ data input circuit 27 and the γ data storage circuit 131 of FIG. 10 are configured such that data can be directly input from the γ data input circuit 27 to the FFs 1311 to 131*m* without shift operations of the γ data storage circuit 131. A selector 275 of the γ data input circuit 27 receives sequentially LUT values and inputs a value "1" to the FF corresponding to each LUT value. For example, if the LUT value is 0, a value "1" is input to the first FF1311; if the LUT value is 3, the value "1" is input to the forth FF1314 from the first FF1311.

The configuration of FIG. 10 is effective in the case where the conversion to the γ data and storage of the γ data should be executed in a short period. In the configuration of FIG. 8, at least 256 clocks are necessary for storing the γ data, while in the configuration of FIG. 10, 64 clocks are necessary for storing the γ data. Hence, in accordance with a speed for transferring the LUT data from the processor 2, the conversion to the γ data and storage of the γ data can be executed. Incidentally, the γ data can be output from the γ data storage circuit 131 by selecting a read operation in response to the R/W signal, and setting all the output values of the selector 275 to "1" to execute the shift operation of the γ data storage circuit 131.

Fourth Embodiment

Figure 11:
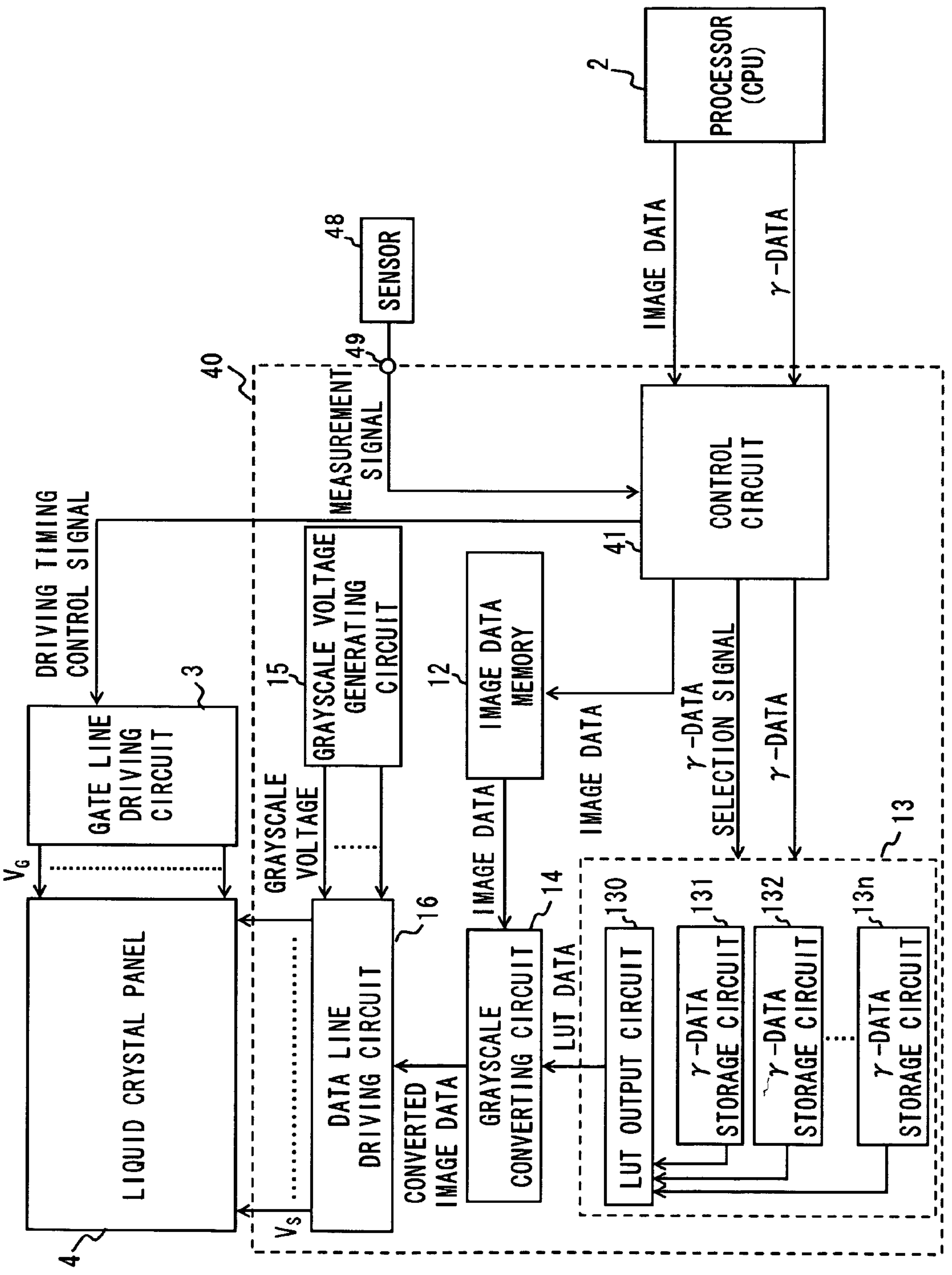
FIG. 11 is a diagram of the controller driver according to a fourth embodiment of the present invention.

FIG. 11 shows the configuration of a controller driver 40 according to a fourth embodiment of the present invention. The controller driver 40 has a feature that a terminal 49 for inputting a measurement signal of an illuminance sensor 48 is provided, and in accordance with the measurement signal of the illuminance sensor 48, a controller 41 determines whether or not to change the LUT. If the controller 41 determines that the LUT should be changed, the γ data selection signal is sent to the LUT creating circuit 13. Incidentally, an operation of creating the LUT creating circuit 13 and changing an LUT of the grayscale converting circuit 14 in accordance with the γ data selection signal is the same as that of the first embodiment, so its description is omitted.

With such configuration, an LUT can be changed in accordance with a change in ambient light for the liquid crystal panel 4. For example, a semi-transmissive liquid crystal panel used in a cell phone terminal or the like has gamma characteristics that vary among the case where a backlight is used as a light source, the case where the sunlight is used as a light source, and the case where a fluorescent lamp is used as a light source. The controller driver 40 of this embodiment can change the LUT in accordance with the change in gamma characteristics.

Incidentally, the illuminance sensor 48 aims at measuring the surrounding environments of the liquid crystal panel 4, and thus is desirably provided around the liquid crystal panel 4.

Further, in place of the illuminance sensor 48, or in addition to the illuminance sensor 48, a sensor for measuring physical quantity of other factors that would influence the gamma characteristics may be provided.

With such configuration, the processor 2 does not need to output the γ data selection signal that designates rewriting of an LUT in accordance with the surrounding environments, so a load on the processor 2 can be alleviated.

Fifth Embodiment

Figure 12:
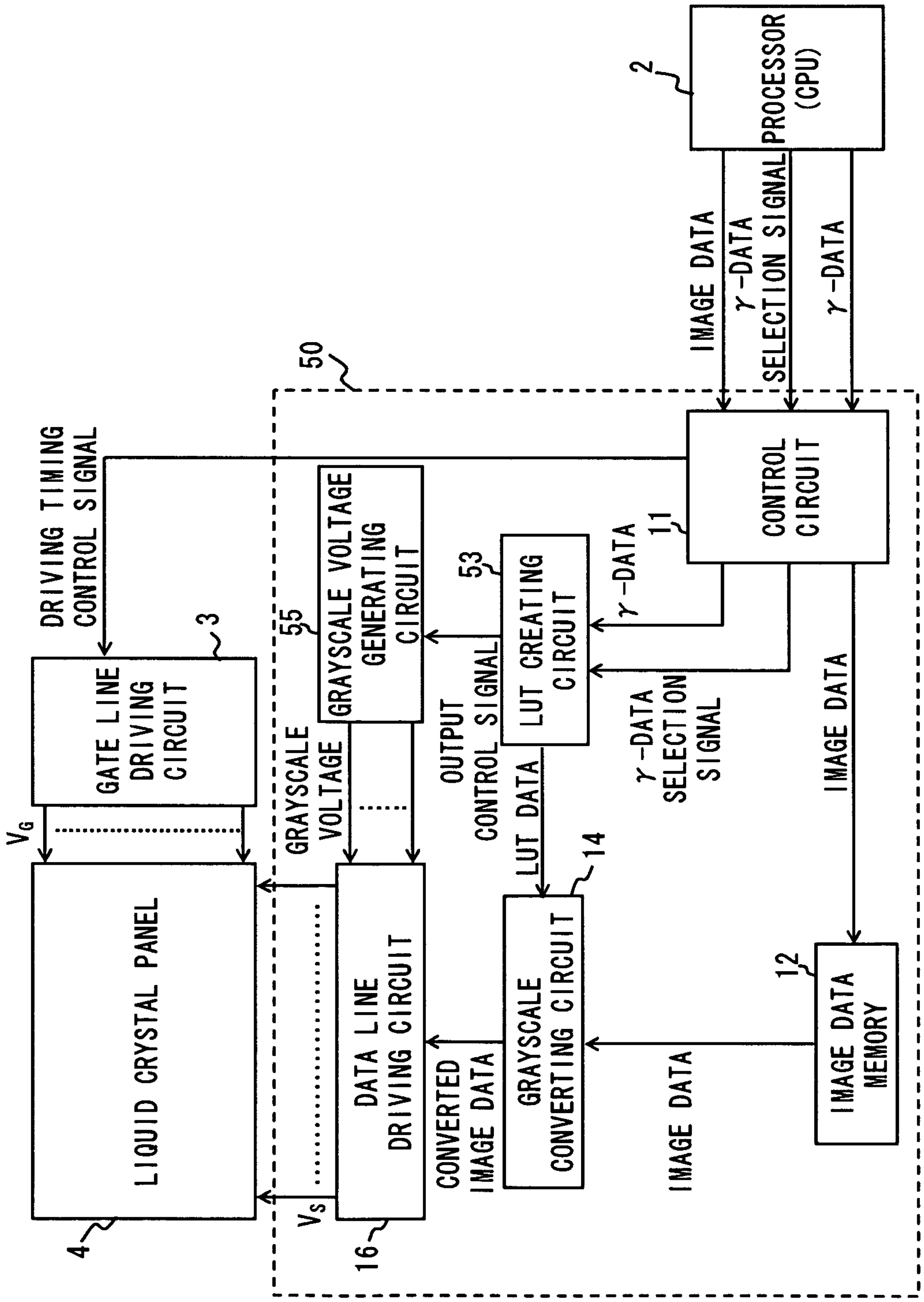
FIG. 12 is a diagram of the controller device according to a fifth embodiment of the present invention.

FIG. 12 shows the configuration of a controller driver 50 according to a fifth embodiment of the present invention. The controller driver 50 differs from the controller driver 10 of the first embodiment of the invention in that the LUT creating circuit 53 controls an output of the grayscale voltage generating circuit 55. A detailed description thereof is given below.

As a known method of driving the liquid crystal panel 4, amplifiers having an ability to drive the liquid crystal panel 4 are provided in the grayscale voltage generating circuit 55 of the controller driver 50 for each grayscale. The data line driving circuit 16 selects a grayscale voltage corresponding to a grayscale of the image data to drive a data line (see Japanese Unexamined Patent Publication No. 2002-108301, for instance).

With such configuration, when grayscale converting circuit 14 executes grayscale conversion from the 6-bit image data to 8-bit image data, the grayscale voltage generating circuit 55 needs to output grayscale voltages corresponding to 256 grayscale levels. However, only a part of the grayscale voltages are actually used. Even if different grayscale voltages are selected for image data of three colors of R, G, and B, the actually used voltage corresponds to 192 grayscales (=64×3) at the maximum. Hence, if the grayscale voltage generating circuit 55 outputs even grayscale voltages that are not used, electric power is wasted.

In the controller driver 50 of this embodiment, the LUT creating circuit 13 controls an output of an amplifier of the grayscale voltage generating circuit 55 using the γ data, and stops the operation of the amplifier that outputs a grayscale voltage that is not used.

As shown in FIG. 3, the γ data address of the γ data G[j] corresponds to a grayscale value of the image data after the gamma correction. Further, the γ data value indicates whether or not a grayscale value corresponding to the γ data address is included in the LUT value. That is, a grayscale corresponding to the γ data address with the γ data value of "1" is a conceivable grayscale of the image data after the gamma correction, and a grayscale corresponding to the γ data address with the γ data value of "0" is an inconceivable grayscale of the image data after the gamma correction.

Accordingly, the γ data is used as an output control signal for the amplifier of the grayscale voltage generating circuit 15, and the amplifier that outputs a grayscale voltage corresponding to the grayscale with the γ data value of "0" is stopped to save power consumption of the grayscale voltage generating circuit 55.

Figure 13:
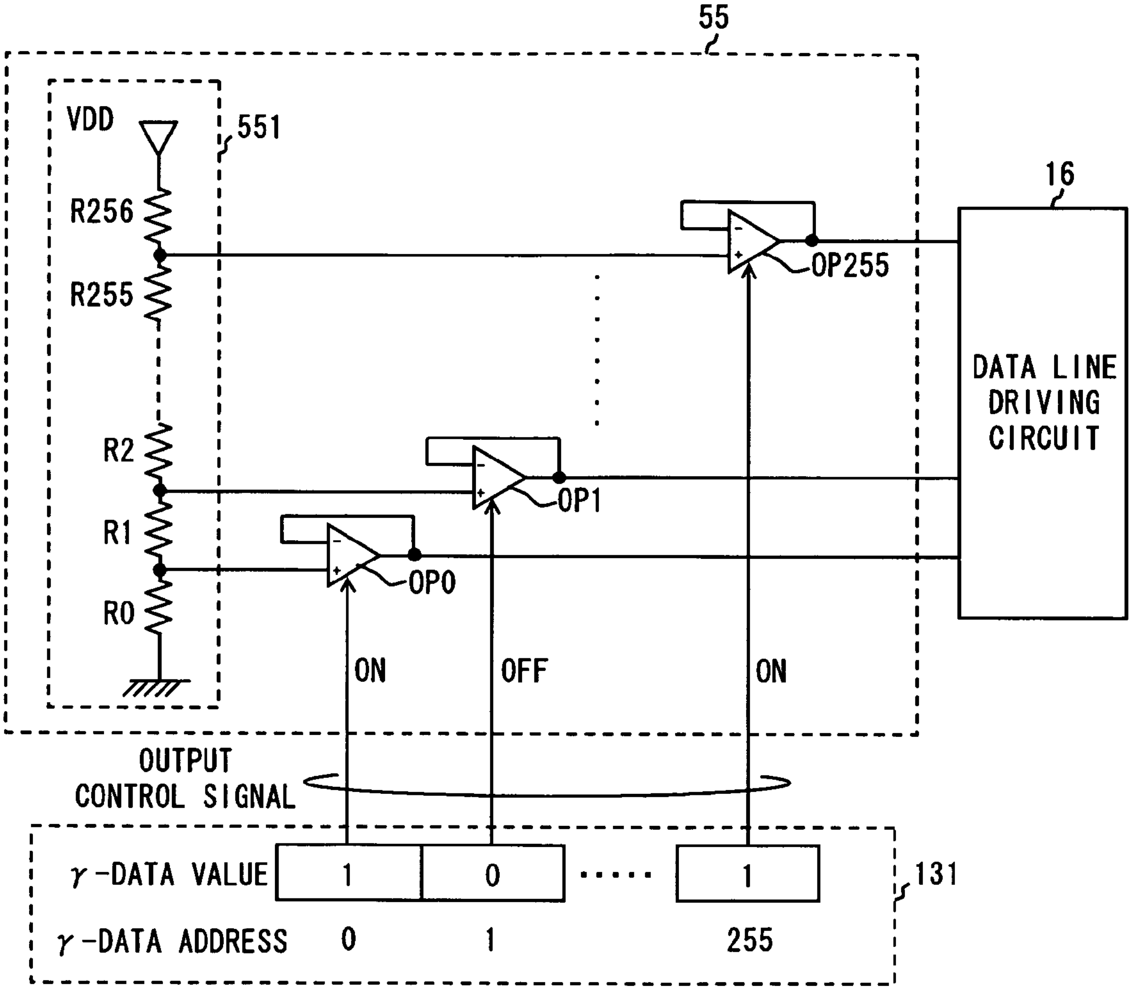
FIG. 13 illustrates a method of controlling an output of a grayscale voltage generating circuit.

FIG. 13 shows a configuration example of the grayscale voltage generating circuit 55. FIG. 13 shows the configuration for outputting grayscale voltages corresponding to 256 grayscales. The grayscale voltage generating circuit 55 divides a high-potential reference voltage VDD and ground voltage by means of a ladder resistor 551 to generate 256 grayscale voltages. The grayscale voltages divided by the ladder resistor 51 are applied to the amplifiers OP0 to OP255, and output voltages of the amplifiers OP0 to OP255 are supplied to the data line driving circuit.

The γ data corresponding to the LUT used for the grayscale converting circuit 14 executes ON/OFF control of the output of the amplifiers OP0 to OP255. FIG. 13 shows the case where the γ data stored in the γ data storage circuit 131 is used for the control. For example, the γ data value of the γ data address of "0" is "1", so an output of the amplifier OP0 corresponding to a grayscale of "0" is ON. On the other hand, the γ data value of the γ data address of "1" is "0", so an output of the amplifier OP1 corresponding to the grayscale of "1" is OFF. Thus, amplifiers that output grayscale voltages corresponding to 64 possible grayscales of the image data after the gamma correction are allowed to operate, and the other amplifiers are stopped. Incidentally, in the example of FIG. 13, for ease of illustration, only one γ data is used to control the amplifiers OP0 to OP255, but with the actual configuration, the logical sum (OR) of γ data values of R, G, and B may be used to control the amplifiers.

Figure 14:
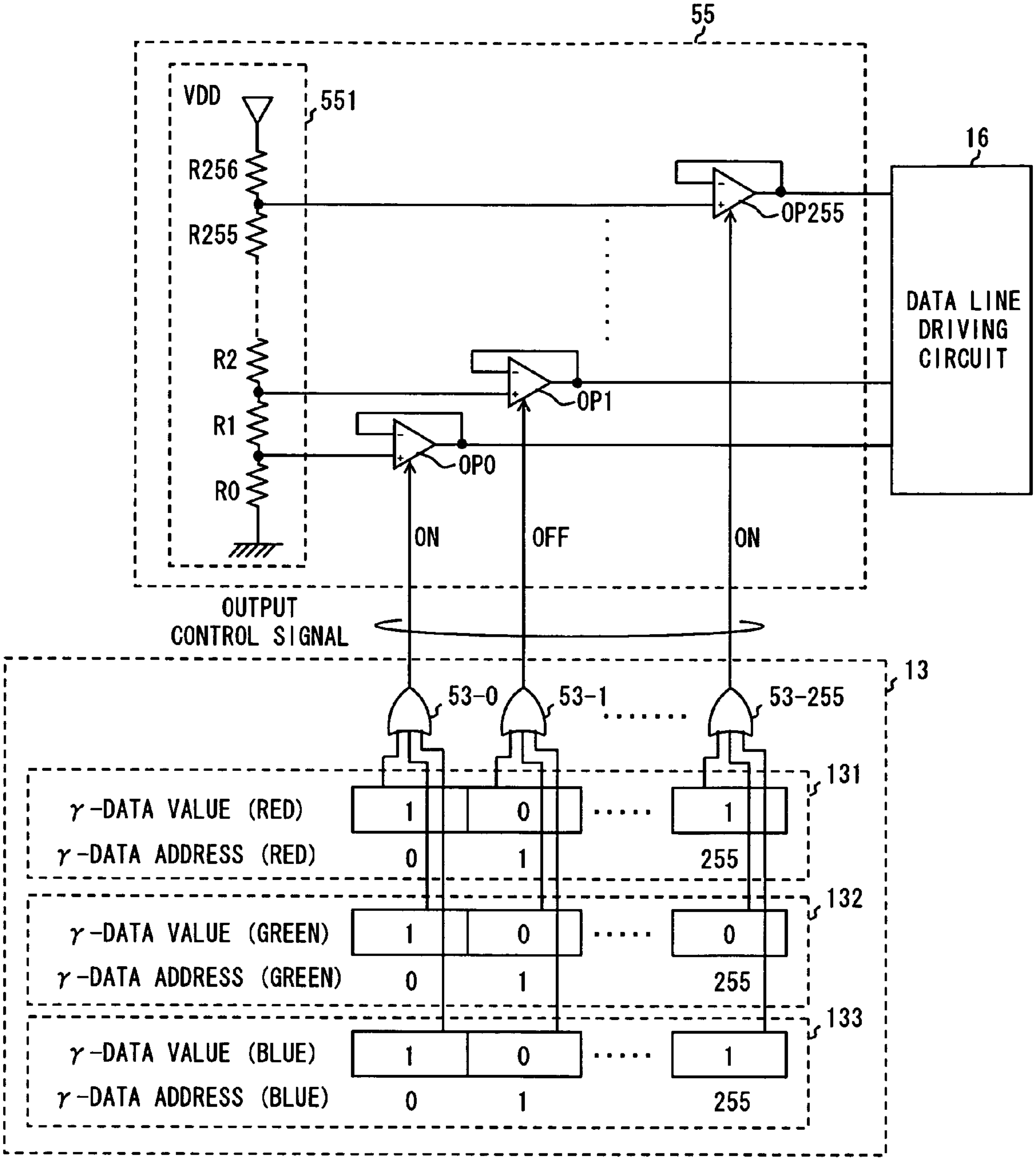
FIG. 14 illustrates a method of controlling an output of a grayscale voltage generating circuit.

FIG. 14 shows a configuration example where the logical sum of γ data values of R, G, and B is used to control the amplifiers. FIG. 14 shows the configuration where three γ data corresponding to RGB stored in the γ data storage circuit 131 to 133 are used to control the amplifiers. The LUT creating circuit 53 includes as many OR circuits for outputting the logical sum of three γ data values with the same γ data address as the γ data values, and an output of each OR circuit is used to control the output of the amplifiers OP0 to OP255. The OR circuit group 531 of FIG. 14 corresponds to the OR circuit.

In the example of FIG. 14, all the γ data values corresponding to the γ data address of "0" are "1", so an output of the OR circuit 53-0 is "1", and an output of the amplifier OP0 corresponding to an output grayscale of "0" is ON. On the other hand, all γ data values of the γ data address of "1" are "0", so an output of the OR circuit 53-1 is "0", and an output of the amplifier OP1 corresponding to the grayscale of "1" is OFF. Further, with the data address of "255", the γ data values of R and B are "1", and an output of the OR circuit 53-0 is "1", and an output of the amplifier OP255 corresponding to the output grayscale of "255" is ON. Thus, only 64 to 192 amplifiers are operated, which output grayscale voltages corresponding to all possible grayscales of the image data after the gamma correction, and the other amplifiers stop outputting grayscale voltage.

With the configurations of FIGS. 13 and 14, an output of an amplifier of the grayscale voltage generating circuit 55 can be easily controlled using the γ data.

Other Embodiments

The above first to fifth embodiments of the invention describe that the controller drivers 10, 20, 30, 40, and 50 do not include the gate line driving circuit 3. The configuration is one example. The controller drivers 10, 20, 30, 40, and 50 may include the gate line driving circuit 3 or include a power supply circuit. The controller driver thus configured can attain the operation and effects of the present invention.

It is apparent that the present invention is not limited to the above embodiment that may be modified and changed without departing from the scope and spirit of the invention. For example, the above embodiments describe a case where the present invention is applied to the controller driver for driving the liquid crystal panel. However, the present invention is not limited to the case of displaying an image on the liquid crystal panel but is applicable to other display control apparatuses for executing gamma correction on an image displayed on a display device other than the liquid crystal panel.

What is claimed is:

1. A display control apparatus for executing gamma correction on input image data of an input image to be displayed in a display apparatus, the display control apparatus comprising:

a plurality of storage circuits storing a plurality of gamma data sequences, said display control apparatus is configured to receive the plurality of gamma data sequences and to store each gamma data sequence of said plurality of gamma data sequences in a corresponding storage circuit of said plurality of storage circuits; and a terminal receiving a measurement signal of a sensor for measuring elements of the environment surrounding said display control apparatus;

a gamma data terminal receiving a gamma data sequence corresponding to gamma characteristics of said display apparatus;

a look-up-table (LUT) creating circuit creating a LUT for gamma correction according to a gamma data sequence of said plurality of gamma data sequences selected according to said measurement signal; and a grayscale converting circuit converting grayscale values of said input image data into gamma-corrected grayscales according to said LUT;

wherein said gamma data sequence comprises $2^k$ gamma data addresses each having a corresponding gamma data value that is a single-bit, the gamma data addresses corresponding to grayscale values of the image data after the gamma correction, k is a positive integer indicating the bits of resolution of the gamma-corrected grayscales, and wherein in response to the gamma data value of a gamma data address being a first value, the LUT is created using the grayscale value of that gamma data address, and in response to the gamma data value of a gamma data address being a second value, the LUT is not created using the grayscale value of that gamma data address.

2. The display control apparatus according to claim 1, wherein said LUT creating circuit creates said LUT based on an argument of the single-bit elements of said gamma data sequence which contain a predetermined logical value.

3. The display control apparatus according to claim 2, wherein said predetermined logical value is a "1", and, in said gamma data sequence, the number of elements containing a "1" is $2^i$ or less, where i is a positive integer indicating the bits of resolution of the grayscales of said input image data.

4. The display control apparatus according to claim 1, further comprising a storage circuit, wherein the display control apparatus stores said gamma data sequence in said storage circuit, said storage circuit includes a shift register for storing said gamma data sequence, and said shift register is configured to output said gamma data sequence through a shift operation, and to feed said gamma data sequence back to said shift register as an input to continuously store said input data sequence.

5. The display control apparatus according to claim 1, further comprising:

a selection terminal receiving a gamma data selection signal, wherein said LUT creating circuit creates a LUT using a gamma data sequence of said plurality of gamma data sequences selected according to said gamma data sequence selection signal.

6. The display control apparatus according to claim 1, wherein said sensor measures illuminance.

7. The display control apparatus according to claim 1, further comprising:

a gamma data input circuit for converting an externally input LUT into a gamma data sequence; and a storage circuit, wherein wherein said gamma data sequence generated by said gamma data input circuit is stored in said storage circuit.

8. The display control apparatus according to claim 1, further comprising:

a grayscale voltage generating circuit for generating a grayscale voltage to be applied to a liquid crystal panel by use of a plurality of amplifiers; and a data line driving circuit for driving a data line of the liquid crystal panel by selecting a voltage to be applied to the liquid crystal panel out of the grayscale voltages based on said gamma-corrected grayscales, wherein outputs of the plurality of amplifiers are controlled based on elements of said gamma data sequence.

9. The display control apparatus according to claim 8, wherein logical values of said gamma data sequence indicate whether the value as the argument of the location of said logical values is used in the look-up table, and an amplifier that creates a grayscale not included in the output image out of the plurality of amplifiers is stopped based on the array elements of the data sequence.

10. The display control apparatus according to claim 8, wherein the display control apparatus is an IC enclosed in a single package.

11. A method of creating a look-up table (LUT) showing a correspondence between input image data and output image data, the LUT used for gamma correction according to a gamma data sequence corresponding to gamma characteristics of a display apparatus and for converting grayscale values of the input image data into gamma-corrected grayscales, said method comprising:

receiving a plurality of gamma data sequences and storing each gamma data sequence of said plurality of gamma data sequences; and receiving a measurement signal of a sensor for measuring elements of the environment surrounding a display control apparatus;

referencing a gamma data sequence of the plurality of gamma data sequences according to the measurement signal, the gamma data sequence including $2^k$ gamma data addresses each having a corresponding gamma data value that is a single-bit, the gamma data addresses corresponding to grayscale values of the image data after the gamma correction, k is a positive integer indicating the bits of resolution of the gamma-corrected grayscales;

setting, in response to the gamma data value of a gamma data address being a first value indicating that the grayscale value of that gamma data address is converted in said LUT, the corresponding single-bit of that gamma data address to indicate that that gamma data address will be used in the LUT as a grayscale value of the output image data;

setting, in response to the gamma data value of a gamma data address being a second value indicating that the grayscale value of that gamma data address is not converted in said LUT, the corresponding single-bit of that gamma data address to indicate that that gamma data address will not be used in the LUT as a grayscale value of the output image data;

calculating a grayscale value of the input image data based on a sum of elements of the gamma data sequence;

associating the grayscale value of the output image data with the calculated grayscale of the input image data as elements of the look-up table, wherein at least one from among the referencing, setting, calculating, and associating is performed by the display control apparatus.

12. The method of creating a look-up table according to claim 11, wherein in the gamma data sequence, the number of array elements where the grayscale value represented as the argument is used in the look-up table is $2^i$ or less, where i is a positive integer that is less than k.

13. The method of creating a look-up table according to claim 11, wherein each array element of the gamma data sequence is a 1-bit value.

14. A display control apparatus for executing gamma correction on input image data of an input image to be displayed in a display apparatus, the display control apparatus comprising:

a plurality of storage circuits storing a plurality of gamma data sequences, said display control apparatus is configured to receive the plurality of gamma data sequences and to store each gamma data sequence of said plurality of gamma data sequences in a corresponding storage circuit of said plurality of storage circuits;

a terminal receiving a measurement signal of a sensor for measuring elements of the environment surrounding said display control apparatus;

a gamma data terminal that receives a gamma data sequence corresponding to gamma characteristics of said display apparatus, wherein said gamma data sequence is a one dimensional bit array of between $2^i$ and $2^k$ single-bit elements stored in a memory of the display control apparatus that indicate whether a gamma data correction grayscale value corresponding to one of grayscale values of said input image data is included in a look-up-table (LUT), wherein addresses of the between $2^i$ and $2^k$ single-bit elements in the one dimensional bit array indicate the gamma data correction grayscale values included in the LUT, where i is a positive integer indicating bits of resolution of grayscales of said input image data, k is a positive integer indicating bits of resolution of the gamma data correction grayscale values included in the LUT, and k is larger than i;

a look-up-table (LUT) creating circuit that populates addresses of the LUT and the gamma data correction grayscale values at the addresses of the LUT, based on a gamma data sequence of the plurality of gamma data sequences and the measurement signal, wherein in response to the single-bit element of an address being a first value, the LUT is created using the gamma data correction grayscale value of that address, and in response to the single-bit element of an address being a second value, the LUT is created without using the gamma data correction grayscale value of that address; and a grayscale converting circuit that converts the grayscale values of said input image data into the gamma data correction grayscale values according to said LUT.

* * * * *

UNITED STATES PATENT AND TRADEMARK OFFICE

CERTIFICATE OF CORRECTION

PATENT NO. : 8,705,135 B2
APPLICATION NO. : 11/407055
DATED : April 22, 2014
INVENTOR(S) : Hirobumi Furihata and Takashi Nose It is certified that error appears in the above-identified patent and that said Letters Patent is hereby corrected as shown below:

In the Specification

Column 1, Line 18: Delete “correction”” and insert -- correction”. --

Column 1, Line 38: Delete “as manγ” and insert -- as many --

Column 4, Line 27: Delete “the y” and insert -- the γ --

In the Claims

Column 12, Lines 37-38: In Claim 7, delete “wherein wherein” and insert -- wherein --

Column 13, Line 20: In Claim 11, delete “that that” and insert -- that --

Column 13, Line 27: In Claim 11, delete “that that” and insert -- that --

Signed and Sealed this
Eighteenth Day of November, 2014

Michelle K. Lee
*Deputy Director of the United States Patent and Trademark Office*